(12) United States Patent
Takayama

(10) Patent No.: US 6,614,610 B1
(45) Date of Patent: Sep. 2, 2003

(54) TAPE DRIVE UNIT AND RECORDING MEDIUM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/449,608

(22) Filed: Nov. 30, 1999

(30) Foreign Application Priority Data

Dec. 2, 1998 (JP) .......................................... P10-343424

(51) Int. Cl.$^7$ .............................................. G11B 15/07
(52) U.S. Cl. .......................................... 360/69; 360/71
(58) Field of Search .......................... 360/69, 71, 72.1, 360/132

(56) References Cited

U.S. PATENT DOCUMENTS

| 5,327,549 A | | 7/1994 | Nissimov et al. | |
| 5,907,444 A | * | 5/1999 | Oguro | 360/69 |
| 6,043,948 A | * | 3/2000 | Takayama | 360/69 |

FOREIGN PATENT DOCUMENTS

| EP | 0 851 421 | 7/1998 | |
| JP | 06208777 A | * | 7/1994 |
| JP | 08101801 | 4/1996 | |

OTHER PUBLICATIONS

"Cassette Having Memory and Cassette Player," Jul. 1994, Patent Abstracts of Japan Machine Translation of JP6–208777.*

* cited by examiner

Primary Examiner—David Hudspeth
Assistant Examiner—James L Habermehl
(74) Attorney, Agent, or Firm—Rader, Fishman & Grauer PLLC; Ronald P. Kananen

(57) ABSTRACT

A tape drive unit includes a tape drive unit for recording or reproducing information on or from a magnetic tape when a tape cassette including the magnetic tape is loaded, a memory drive unit for reading or writing management information by performing communication with a memory for managing recording to or reproduction from the magnetic tape when the loaded tape cassette includes the memory, a detecting unit for detecting data-transfer information on the memory, the data-transfer information stored in the memory, and a setting unit for setting, based on the data-transfer information, the communication method of the memory drive unit.

4 Claims, 9 Drawing Sheets

FIG. 5

| | | |
|---|---|---|
| MANUFACTURE INFORMATION (FL1) | MANUFACTURE PART CHECKSUM | 1 BYTE |
| | MIC TYPE | 1 BYTE |
| | MIC MANUFACTURE DATE | 4 BYTES |
| | MIC MANUFACTRE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURED DATE | 4 BYTES |
| | CASSETTE MANUFACTURER LINE NAME | 8 BYTES |
| | CASSETTE MANUFACTURER PLANT NAME | 8 BYTES |
| | CASSETTE MANUFACTURER NAME | 8 BYTES |
| | CASSATTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES ~FL11 |
| | MAXIMUM WRITE CYCLE | 1 BYTE ~FL12 |
| | MIC CAPACITY | 1 BYTE |
| | WRITE PROTECT START ADDRESS | 2 BYTES |
| | WRITE PROTECTED DATA BYTE COUNT | 2 BYTES |
| | RESERVED | 2 BYTES |

FIG. 7

| VOLUME TAG (FL3) | VOLUME INFORMATION CHECKSUM | 1 BYTE |
| --- | --- | --- |
| | VOLUME INFORMATION | 100 BYTES |
| | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| | CARTRIDGE SERIAL NUMBER | 32 BYTES |
| | MANUFACTURER ID | 1 BYTE |
| | SECONDARY ID | 1 BYTE |
| | CARTRIDGE SESRIAL NUMBER PART CHECKSUM | 1 BYTE |
| | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

TAPE DRIVE UNIT AND RECORDING MEDIUM

BACKGROUND OF THE INVENTION

1. Field of the Invention

The present invention relates to a tape drive unit and to a recording medium.

2. Description of the Related Art

A so-called "tape streaming drive" is known as a drive unit for recording/reproducing digital data on/from a magnetic tape. This tape streaming drive can have a large recording capacity of, for example, approximately several dozen to several hundred gigabytes, although the capacity varies according to the length of the tape (as a medium) in the tape cassette. Accordingly, the tape streaming drive has various uses, such as a backup of data recorded on a medium such as a hard disk for a computer. The tape streaming drive is suitable for storing image data, which is typically large.

As the above-described tape streaming drive, one that performs data recording/reproduction by employing a helical scan system using a rotary head and using, for example, an 8-mm videocassette-recorder (VCR) tape cassette as a recording medium, has been proposed.

A tape streaming drive using an 8-mm VCR tape cassette, as described above, uses, for example, a small computer system interface (SCSI) as an input/output interface for recording/reproduced data.

In the recording mode, data supplied from, for example, a host computer, are input via the SCSI. Predetermined compression and encoding processes on the input data are performed and the processed data are recorded on a magnetic tape in a tape cassette.

In the reproducing mode, the data on the magnetic tape are read and decoded. The decoded data are transmitted to the host computer via the SCSI.

In data storage systems comprised of the tape streaming drive, the host computer, and the tape cassette, one has been developed that includes a nonvolatile memory in the tape cassette and stores, in the nonvolatile memory, various types of management information related to the operations of recording and reproduction on the magnetic tape.

In the nonvolatile memory, a terminal for an interface is formed on the tape cassette and is connected to a corresponding terminal of the tape streaming drive when the tape cassette is loaded. This enables the tape streaming drive to access the nonvolatile memory.

In the nonvolatile memory, for example, tape-cassette manufacturing information, use-record information, on-magnetic-tape partition information, etc., are recorded as management information. By storing the management information in the nonvolatile memory, the efficiency of various operations is highly increased compared with the recording of the management information in a specific region on the magnetic tape. That is, the need to run the tape to write and read the management information is eliminated, greatly shortening the time required for reading and updating the management information. In other words, the writing and reading of the management information can be performed regardless of the position on the magnetic tape and the operation status. In addition, this broadens the application range of the management information and enables various and effective control processes.

In the case where the tape streaming drive acquires required information by accessing the nonvolatile memory, data communication is performed in units of required data lengths at a clock frequency. In the case where such data transfer is performed, communication is possible when, for example, a data-communicatable data-length unit, a clock frequency, and so forth (the data-length unit and the clock frequency, etc., are hereinafter referred to as the "communication method"), as tape-streamer-drive performance, are equivalent to or less than the communication method of the nonvolatile memory of the tape cassette. Therefore, in the tape streaming drive, it is preferable to set the data-length unit to be shorter and the clock frequency to be slower in order to maintain compatibility with a tape cassette including a nonvolatile memory having a communication method of differing performance.

When the communication method is set using a short data-length unit and a slow clock frequency in the tape streaming drive, compatibility with plural types of tape cassettes can be obtained. However, in the case where a tape cassette includes a nonvolatile memory having a communication method of higher performance than that of the tape streaming drive, the tape streaming drive cannot perform the communication method reliably. In other words, the communication method of the tape streaming drive limits the amount of information which can be transferred at one time. Thus, for the reading/writing of relatively large amounts of data, data transfer must be performed plural number of times.

Therefore, a problem occurs in that, for a nonvolatile memory having high performance, operations adapted for its communication method cannot be performed, hindering efficient reading/writing of data.

SUMMARY OF THE INVENTION

Accordingly, it is an object of the present invention to provide a tape drive unit and a recording medium in which data is efficiently read/written by performing operations adapted for a communication method.

To this end, according to an aspect of the present invention, the foregoing object is achieved through provision of a tape drive unit including a tape drive unit for recording or reproducing information on or from a magnetic tape when a tape cassette including the magnetic tape is loaded, a memory drive unit for reading or writing management information by performing communication with a memory for managing recording to or reproduction from the magnetic tape when the loaded tape cassette includes the memory, a detecting unit for detecting data-transfer information on the memory which is stored in the memory, and a setting unit for setting, based on the data-transfer information, the communication method of the memory drive unit.

Preferably, the data-transfer information includes unit-data information and clock-frequency information used when the memory performs data communication with the memory drive unit.

The communication method setting unit may set the memory drive unit to be in initial condition before the data-transfer information is detected.

In the initial condition, the lowest clock frequency and the shortest unit-data length which can be set by the memory drive unit may be set.

According to another aspect of the present invention, the foregoing object is achieved through provision of a recording medium including a tape cassette including a magnetic tape, and a memory, included in the tape cassette, which stores management information for managing recording to or reproduction from the magnetic tape, wherein data-transfer information on the memory is stored in the memory.

Preferably, the data-transfer information includes unit-data-length information and clock-frequency information used when data communication is performed with a memory drive unit in a tape drive unit into which the recording medium is loaded.

According to the present invention, a tape drive unit uses efficient data transfer to enable the reading or writing of management information by fully using the performance of the memory.

In addition, since data-transfer information is stored in the memory in the recording medium, whenever the recording medium is loaded into the tape drive unit, the tape drive unit can detect its data-transfer information from the memory. In other words, the data transfer information can be supplied to the tape drive unit adapted for the memory.

Moreover, the tape drive unit can detect, as the data transfer information, data-length-unit information on transfer data from the memory and clock-frequency information at the time of data transfer. Accordingly, the tape drive unit can perform accessing, using a maximum data-length unit of the memory, and can perform data reading or writing at a greatly high speed, using a maximum clock frequency.

BRIEF DESCRIPTION OF THE DRAWINGS

FIG. 5 is an illustration of the manufacture information shown in FIG. 4;

FIG. 7 is an illustration of the volume tag shown in FIG. 4;

DESCRIPTION OF THE PREFERRED EMBODIMENTS

Embodiments of the present invention are described below.

Various types of inventions, related to a tape cassette including a nonvolatile memory and a tape drive unit (tape streaming drive) for the memory-included tape cassette that can perform the recording/reproducing of digital data, have been proposed by the assignee of the present patent application. In the present invention, a data storage system comprised of the memory-included tape cassette and the tape streaming drive is used. The nonvolatile memory included in the tape cassette is called the "memory-in-cassette (MIC)".

The description is given in the following order:
1. Structure of Tape Cassette;
2. Structure of Tape streaming drive;
3. Structure of Data in MIC;
4. Outline of MIC Data Communication; and
5. Detection of Data transfer information.

1. Structure of Tape Cassette

An MIC-included tape cassette adapted for the tape streaming drive is described below with reference to FIGS. 2 and 3.

Figure 2:
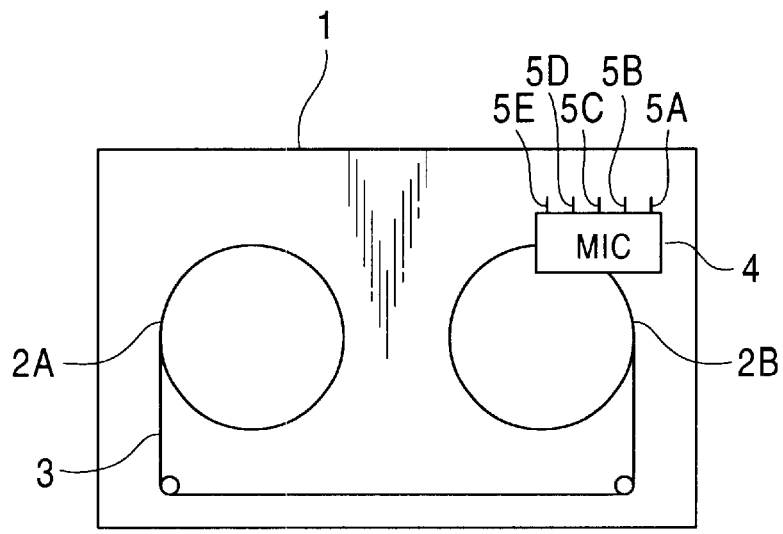
FIG. 2 is a schematic illustration showing the internal structure of a tape cassette according to an embodiment of the present invention.

FIG. 2 shows a conceptual internal structure of a tape cassette. In the tape cassette 1 shown in FIG. 2, reel hubs 2A and 2B are provided, and a magnetic tape 3 having a tape width of 8 mm is provided between both reel hubs 2A and 2B.

The tape cassette 1 is provided with an MIC 4 as a nonvolatile memory. From the MIC 4 as a module, five terminals 5A, 5B, 5C, 5D, and 5E are extended, and they are respectively formed as a power supply terminal, a data input terminal, a clock input terminal, a ground terminal, and an auxiliary terminal. The MIC 4 stores the manufacturing date and manufacturing place of each tape cassette, tape width and length, material, information related to the use record, etc., of recorded data in each partition formed on the tape 3, user information, etc., which are described below. In this specification, various types of information stored in the MIC 4 are also called "management information".

Figure 3:
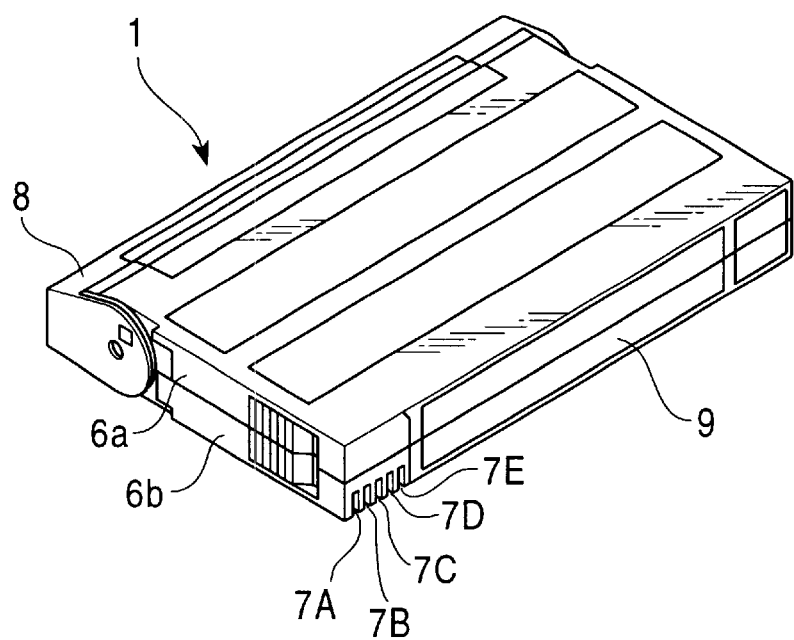
FIG. 3 is a perspective view showing the exterior of the tape cassette shown in FIG. 2.

FIG. 3 shows an exterior view of the tape cassette 1. Its entire housing includes an upper case 6a, a lower case 6b, and a guard panel 8, and is basically similar to the structure of a tape cassette for use in an ordinary 8-mm VCR. On a label surface 9 on a side of the tape cassette 1, terminal pins 7A, 7B, 7C, 7D, and 7E are provided to be connected to the terminals 5A, 5B, 5C, 5D, and 5E described using FIG. 2. In other words, in this embodiment, when the tape cassette 1 is in physical contact with a tape streaming drive 10 (described below), data signals, etc., are mutually transmitted via the terminal pins 7A, 7B, 7C, 7D, and 7E.

2. Structure of Tape Streaming Drive

Figure 1:
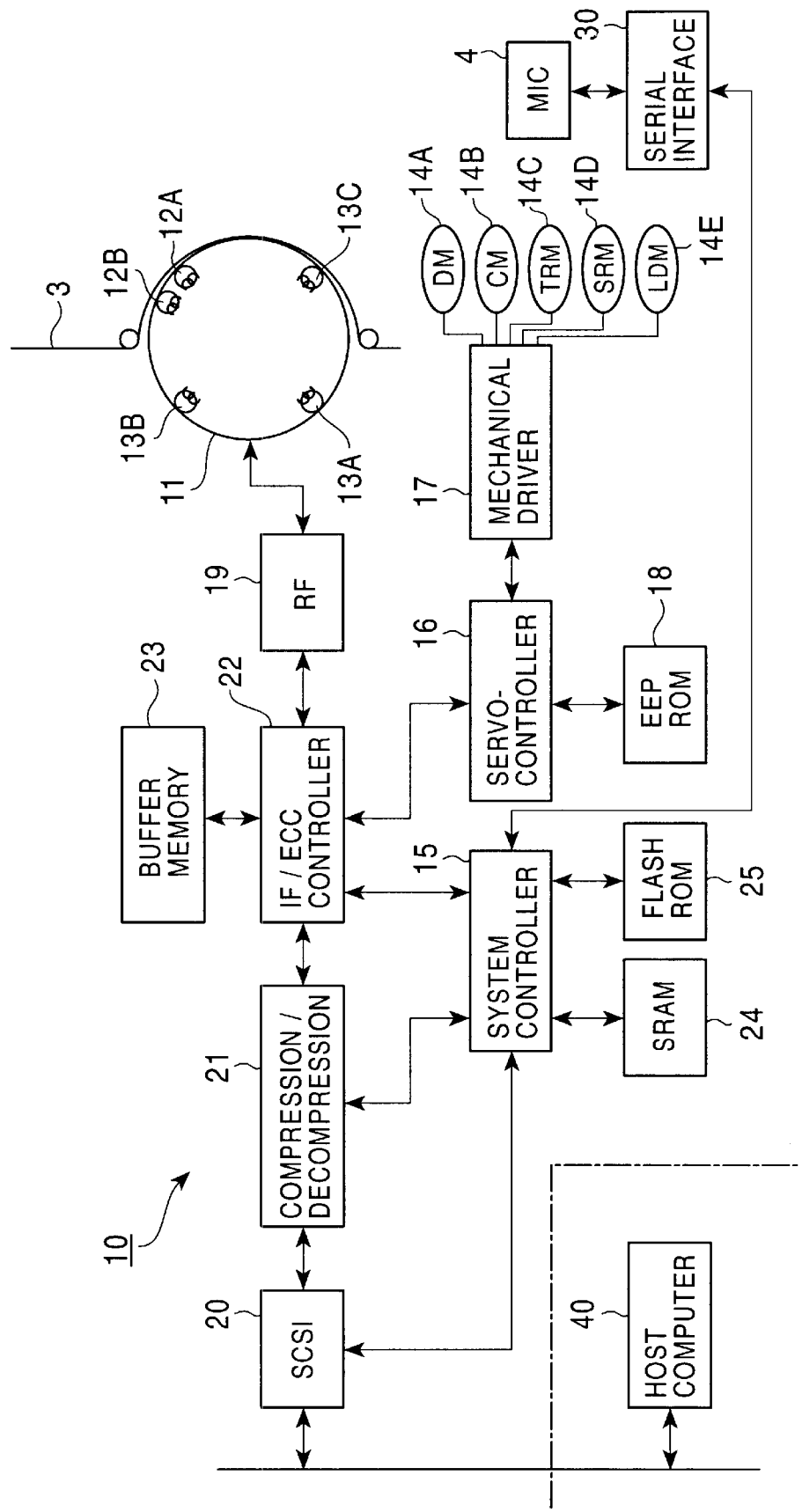
FIG. 1 is a block diagram of a tape streaming drive according to an embodiment of the present invention.

With reference to FIG. 1, the structure of the tape streaming drive 10 according to the embodiment is described below.

In the tape streaming drive 10, a helical scan method is used to perform recording/reproduction on/from the magnetic tape 3 of the tape cassette 1 when it is loaded.

In the rotary drum 11, two recording heads 12A and 12B having different azimuth angles, and three reproducing heads 13A, 13B, and 13C having predetermined azimuth angles, are provided at predetermined intervals of angle.

The rotary drum 11, around which the magnetic tape 3 pulled from the tape cassette 1 is wound, is rotated by a drum motor 14A.

A capstan (not shown) for running the magnetic tape 3 at constant speed is driven to rotate by a capstan motor 14B.

The reel hubs 2A and 2B in the tape cassette 1 are separately driven to rotate in a forward direction and a reverse direction by reel motors 14C and 14D.

A loading motor 14E drives a loading mechanism (not shown) and executes the loading/unloading of the magnetic tape 3 onto the rotary drum 11.

The drum motor 14A, the capstan motor 14B, the reel motors 14C and 14D, and the loading motor 14E are driven to rotate by electric power application from a mechanical driver 17. Based on control by a servocontroller 16, the mechanical driver 17 drives each motor. The servocontroller 16 performs control of the rotational speed of each motor, thereby executing tape running in the normal recording/reproducing mode and tape running in the high speed reproducing mode, tape running in fast forwarding and rewinding modes, a tape cassette loading operation, a loading/unloading operation, a tape tension control operation, etc.

Each of the drum motor 14A, the capstan motor 14B, and the reel motors 14C and 14D is provided with a frequency generator (FG) (not shown), so that the servocontroller 16 executes servo control of each motor, whereby the rotation information of each motor can be detected.

The servocontroller 16 detects an error from the target rotational speed on the rotational operation of each motor by recognizing, based on FG pulses, the rotational speed of each motor and controlling power application (which corresponds to the amount of the error) to the mechanical driver 17, thereby realizing rotational speed control by a closed loop. Therefore, in the various operation modes such as normal running in recording/reproduction, high speed searching, fast forwarding, and rewinding, the servocontroller 16 uses the target rotational speed adapted for each operation mode to control each motor to rotate.

In an EEP-ROM 18, constants, etc., for servo control of each motor by the servocontroller 16 are stored.

The servocontroller 16 is bidirectionally connected to a system controller 15 for executing processing for controlling the entire system via an interface controller/ECC formatter 22 (hereinafter referred to as an "IF controller/ECC formatter").

The tape streaming drive 10 uses an SCSI 20 for data input and output. For example, in the data recording mode, from a host computer 40, sequential data are input in transmission data units called "fixed-length records"via the SCSI 20, and are supplied to a compression/decompression circuit 21. This type of tape streaming drive system also has a mode in which data are transmitted in collective units of variable-length data by the host computer 40.

The compression/decompression circuit 21 uses a predetermined method to perform compression processing on input data, if required. In the case where a type of compressing method using, for example, LZ codes is employed, a dedicated code is assigned to each previously processed character string, and is stored in the form of a dictionary. A character string input subsequently is compared with the contents of the dictionary, and when the character string of the input data matches a code of the dictionary, the code of the dictionary is replaced by the character string data. The data of an input character string having not matched the dictionary is sequentially supplied with a new code, and is recorded in the dictionary. By recording the data of input character strings, and replacing codes of a dictionary by the character string data, data compression is performed.

An output from the compression/decompression circuit 21 is supplied to the IF/ECC controller 22, and the IF/ECC controller 22 temporarily stores the output from the IF/ECC controller 22 in a buffer memory 22 by performing its control operation. Under the control of the IF/ECC controller 22, the data stored in the buffer memory 23 are finally processed as data in fixed-length units each corresponding to 40 magnetic tape tracks called a "group", and the data are processed by ECC format processing.

In the ECC format processing, error-correcting codes are added to recording data, and the data are modulated so as to be adapted for magnetic recording before being supplied to an RF processor 19.

The RF processor 19 generates recording signals by processing the supplied recording data, such as amplification and recording equalizing, and supplies them to the recording heads 12A and 12B. This performs data recording on the magnetic tape 3 from the recording heads 12A and 12B.

Briefly referring to the operation of data reproduction, the recording data on the magnetic tape 3 are read as an RF reproduction signal by the reproducing heads 13A and 13B, and the RF processor 19 performs processing on the reproduced signal, such as reproduction equalizing, reproduction clock generating, binarization and decoding (e.g., Viterbi decoding).

The signal read as described above is supplied to the IF/ECC controller 22, and is initially error-corrected. The corrected signal is temporarily stored in the buffer memory 23, and it is read at a predetermined point of time and supplied to the compression/decompression circuit 21.

Based on determination by the system controller 15, the compression/decompression circuit 21 performs data decompression when the data compressed by the compression/decompression circuit 21 in the recording mode are supplied, while the compression/decompression circuit 21 outputs the supplied data by allowing the supplied data to pass through it when the supplied data are non-compressed data.

The output data from the compression/decompression circuit 21 are output as reproduced data to the host computer 40 via the SCSI.

In FIG. 1, the MIC 4 is shown, together with the magnetic tape 3 of the tape cassette 1. When the tape cassette 1 is loaded into the tape streaming drive 10, the MIC 4 is connected to the system controller 15 via a serial interface 30, using the terminal pins 7A to 7E (shown in FIG. 3) as an input/output stage shown in FIG. 3 so that data communication can be performed. Thereby, the system controller 15 can read the management information recorded in the MIC 4 and can update the management information.

Between the MIC 4 and the host computer 40, mutual transmission of data is performed using SCSI commands. Accordingly, it is not necessary, in particular, to provide a dedicated line between the MIC 4 and the host computer 40. As a result, data exchange between the tape cassette and the host computer 40 can be established by using only the SCSI.

Although the SCSI 20 is used to perform mutual transmission of information between the tape streaming drive 10 and the host computer 40, as described above, the host computer 40 uses SCSI commands to perform various types of communication with the system controller 15.

Therefore, by using SCSI commands, the host computer 40 can instruct the system controller 15 to execute data writing/reading in/from the MIC 4.

In a static random access memory (S-RAM) 24 and a flash ROM 25, data for various processes by the system controller 15 are stored.

By way of example, constants, etc., for control, are stored in the flash ROM 25. In addition, the S-RAM 24 is used as a work memory or a memory for storing the data read from the MIC 4, data to be written in the MIC 4, mode data in units of tape cassettes, various types of flag data, etc., and for arithmetic processing.

The S-RAM 24 and the flash ROM 25 may be provided as internal memories of a microcomputer included in the system controller 15, or may be provided by using part of the areas of the buffer memory 23 as a work memory.

3. Structure of Data in MIC

The structure of data in the MIC 4 included in the tape cassette 1 is described below.

Figure 4:
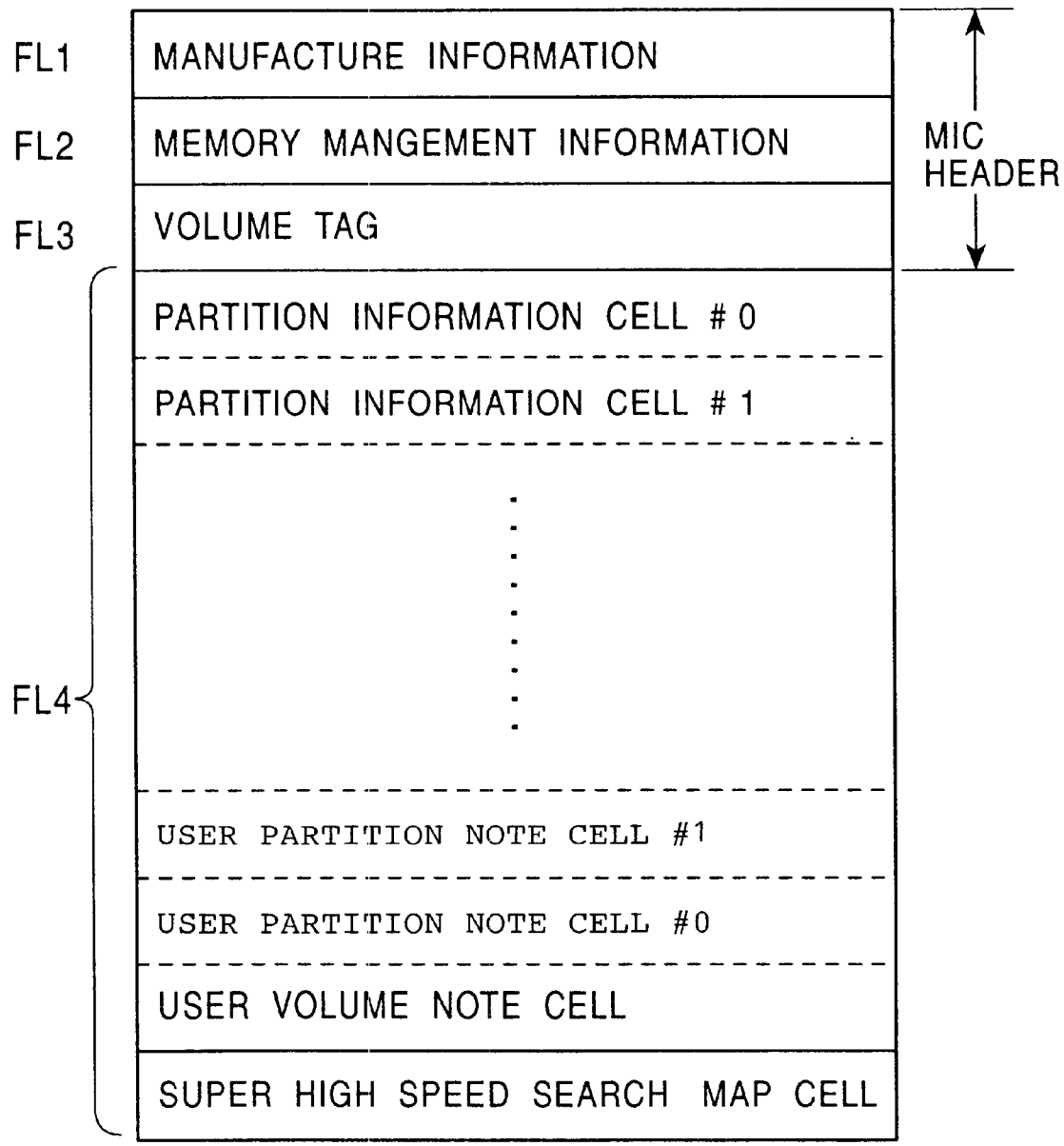
FIG. 4 is an illustration showing the structure of data in the MIC 4 shown in FIG. 2.

FIG. 4 is a schematic drawing showing a structure of data stored in the MIC 4. As shown in FIG. 4, fields FL1 to FL4 are set as the storage area of the MIC 4.

In these fields FL1 to FL4, various types of information obtained when the tape cassette 1 was manufactured, tape information obtained when the tape 3 was initialized, information of each partition, etc., are written.

Field FL1 is called "manufacture information" and is used as a manufacture part for mainly storing various types of information obtained when the tape cassette was manufactured.

Field FL2 is called "memory management information" and is used as a drive-initialize-part for mainly storing information at the time of initialization, etc.

Field FL3 is called "volume tag" for storing basic management information of the entire tape cassette.

Field 4 is used as the area of a memory free pool, and is formed as an area in which management information can be additionally stored. In this memory free pool, various types of information are stored in accordance with the process of the recording/reproducing operation or as required. One unit of a data group stored in the memory free pool is called a "cell".

In accordance with partitions formed on the magnetic tape 3, partition information cells #0, #1, . . . to be used as management information corresponding to each partition are sequentially written from the head of the memory free pool. In other words, the partition information cells are formed as many as partitions are formed on the magnetic tape 3.

In addition, from the end side of the memory free pool, a super high speed search map cell as map information for high speed search is written.

Successively from the end side of the memory free pool, a user volume note cell and user partition note cells are written. The user volume note cell is information such as a user-input comment on the entire tape cassette, and each user partition note cell is information such as user-input comments on the respective partitions. Accordingly, these are stored when the user instructs writing, so that the information is not always described.

An intermediate area in which the information is not stored is left as a memory free pool for subsequent writing.

The manufacture information in Field FL1 has a structure as shown in FIG. 5. The sizes (the number of bytes) of data are shown on the right.

In the first one byte of the manufacture information, information of a checksum for the data of the manufacture information is stored as a manufacture part checksum. The manufacture part checksum is supplied at the time of tape cassette manufacturing.

In addition, an MIC type to a write protected data byte count are described as actual data constituting the manufacture part. Each "reserved" part indicates an area reserved for data storage of the future. This applies to also the following description.

The MIC type represents the type of an MIC that is actually included in the tape cassette.

An MIC manufacture date represents the manufacturing date (and time) of the MIC.

An MIC manufacture line name represents information of a line that manufactured the MIC.

An MIC manufacture plant name represents information of the name of a plant that manufactured the MIC.

An MIC manufacturer name represents information of the name of a manufacturer that manufactured the MIC.

An MIC name represents information of an MIC vendor.

In addition, in a cassette manufacture date, a cassette manufacture line name, a cassette manufacture plant name, a cassette manufacture name, and a cassette name, information on the cassette itself, which is similar to the information on the MIC, is described.

As an OEM customer name, information of the name of an OEM customer is stored.

A physical tape characteristic ID represents information of physical characteristics of the magnetic tape, such as tape material, tape thickness, and tape length.

As a maximum clock frequency, information representing a maximum clock frequency corresponding to the MIC is stored.

A maximum write cycle represents data-length-unit information (as an MIC characteristic) on how many bytes of data can be transferred by performing communication at one time with the tape streaming drive 10. This information is dependent on the physical characteristics of a nonvolatile memory used as the MIC 4.

An MIC capacity represents information of the storage capacity of the MIC.

A write protect start address is used to inhibit writing in a predetermined area of the MIC 4, and represents the start address of the writing-inhibited area.

A write protected data byte count represents the number of bytes of the writing-inhibited area. In other words, an area, occupied for the number of bytes represented in the write protected data byte count from the address designated in the write protect start address, is set as the writing-inhibited area.

Figure 6:
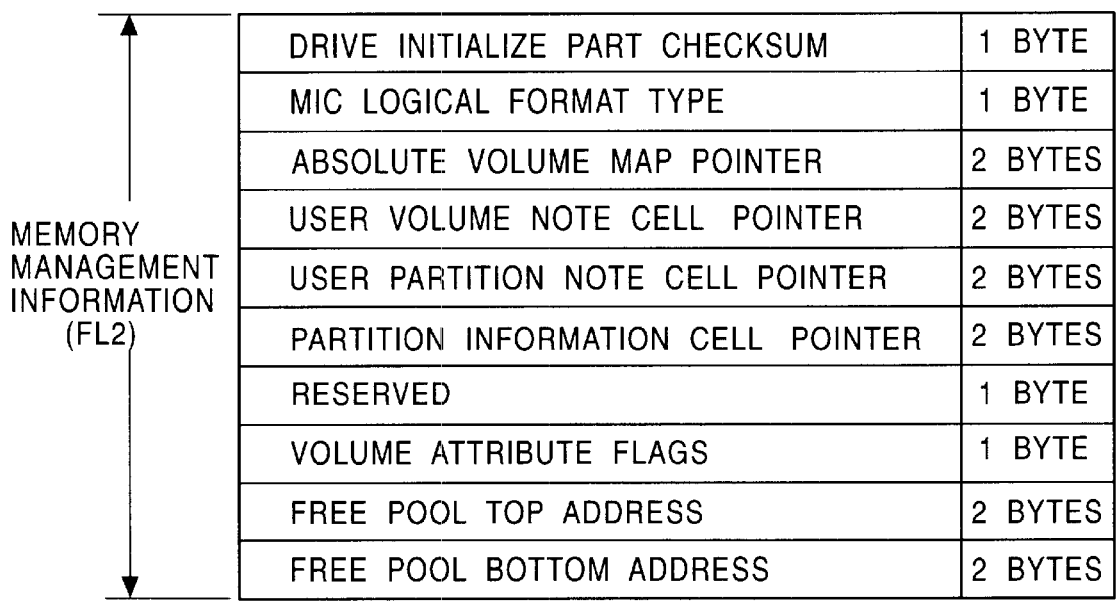
FIG. 6 is an illustration of the memory management information shown in FIG. 4.

With reference to FIG. 6, the structure of the memory management information in Field FL2 is described below. The sizes (the numbers of bytes) of the data are shown on the right.

In the memory management information, information of a checksum of data in the memory management information, which is used as a drive initialize part, is initially stored as a drive initialize part checksum.

Subsequently, as actual data constituting the memory management information, information from an MIC logical format type to a free pool bottom address is described.

At first, the ID number of the logical format of the MIC is stored as an MIC logical format type. MIC formats include, excluding a basic MIC format, various types of formats related to a firmware updating tape MIC format, a reference tape MIC format, a cleaning cassette MIC format, etc. The ID number in accordance with the MIC format of the tape cassette is represented.

In an absolute volume map pointer, a pointer representing the start address of the super high speed search map cell shown in FIG. 4 is set.

A user volume note cell pointer represents the start address of a storage area enabling the user to freely perform reading/writing from/to the tape cassette via the SCSI, that is, the user volume note cell shown in FIG. 4.

A user partition note cell pointer represents the start address of a storage area enabling the user to freely perform reading/writing data from/to each partition via the SCSI, that is, the user partition note cell shown in FIG. 4. In the case where a plurality of user partition note cells may be stored, the user partition note cell pointer represents the start address of a start cell among the user partition note cells.

A partition information cell pointer represents the start address of the partition information cell #0 shown in FIG. 4.

The number of pieces of partition information written in the memory free pool are formed as many as partitions are formed on the magnetic tape 3. All partition information cells #0 to #N are linked by pointers in a link structure. In other words, the partition information cell pointer is used as a root representing the address of partition #0, and the pointers of the subsequent partition information cells are set in the adjacent partition information cells.

As described above, the data positions in field FL4 are managed by the pointers (the absolute volume map pointer, the user volume note cell pointer, the user partition note cell pointer, and the partition information cell pointer).

A volume attribute flag is a 1-byte flag for providing the MIC 4 with a logical writing-inhibiting flag. In other words, the content of the MIC header flag is a manufacture-part writing permission/inhibition or a non-manufacture-part writing permission/inhibition.

A free pool top address and a free pool bottom address represent the start address and end address of the memory free pool at the point of time in field FL2. Since the area as the memory free pool changes in accordance with the writing or erasure of the partition information or the user partition note, etc., the free pool top address or the free pool bottom address is accordingly updated.

With reference to FIG. 7, the structure of the volume tag in field FL 3 is described below. The sizes (the numbers of bytes) of data are shown on the right.

At the start of the volume tag, information of a checksum of the data of volume information, which stores basic management information on the entire tape cassette, is stored as a volume information checksum.

Information on a checksum of the data of an accumulative partition information, which stores record information from the time the tape cassette 1 was manufactured, is stored as an accumulative partition information checksum.

Subsequent to the volume note checksum and the volume note, for example, a serial number that is 32-character information based on the American National Standard Code for Information Interchange (ASCII) is stored as a cartridge serial number.

As a manufacture ID, the code number of the manufacturer of the tape cassette 1, which is a manufacture identifier, is stored.

A secondary ID is a secondary identifier in accordance with the type of the tape cassette 1, and, for example, tape attribute information that is a 1-byte code value is stored.

A cartridge serial number part is used as checksum information for the cartridge serial number, a manufacture ID, and a secondary ID.

Specific volume tags 1 to 13 are used as, for example, a reserve, and each area is comprised of, e.g., 36 bytes.

Subsequently, cells stored in field FL4 shown in FIG. 7 are described.

In field FL4, the partition information cell, the user partition note cell, etc., are stored, as described above.

Figure 8:
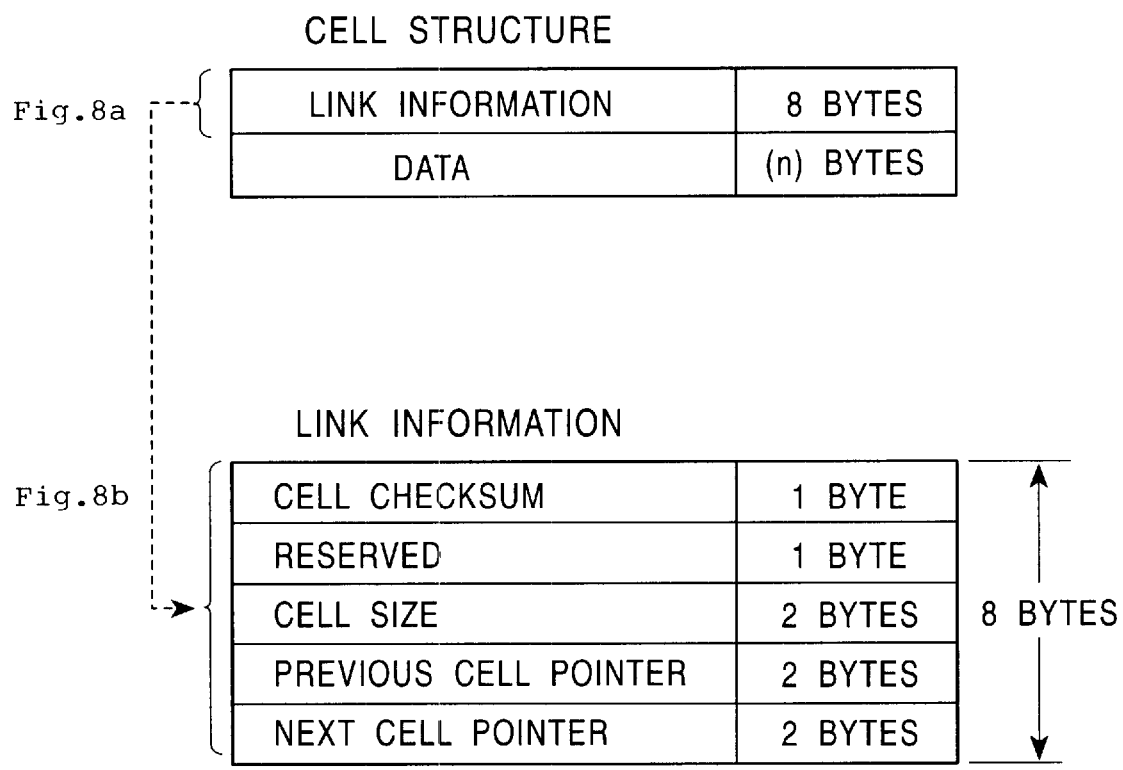
FIG. 8 consists of illustrations of a cell structure in the MIC 4 shown in FIG. 2.

The structure of each cell is shown in FIG. 8.

One cell is formed by 8-byte link information and data having n bytes (differing depending on the cell type), as shown in FIG. 8(*a*).

The 8-byte link information is provided in each cell, and its structure is as shown in FIG. 8(*b*).

As a checksum on the data in the cell, a 1-byte cell checksum is provided.

As a 2-byte cell size, the size of the cell is shown.

A previous cell pointer and a next cell pointer are actual linkage data (data constituting the link structure). When a plurality of cells of the same type are linked, the previous cell pointer and the next cell pointer designate the adjacent two cells.

As a cell having the above-described structure, there are a partition information cell, a super high speed search cell, a user volume note cell, and a user partition note cell. The partition information cell has a fixed cell size. The other cells have variable cell sizes.

Although the data structure in the MIC 4 has been described using FIGS. 4 to 8, as described above, the data structure in the MIC 4 is only an example, and the data arrangement and area setting, data contents, data sizes, etc., are not limited to those described.

4. Outline of MIC Data Communication

When the tape cassette 1 is loaded into the tape streaming drive 10, and communication with the MIC 4 is performed, predetermined data units and frequency clock are used to perform data transfer.

Figure 9:
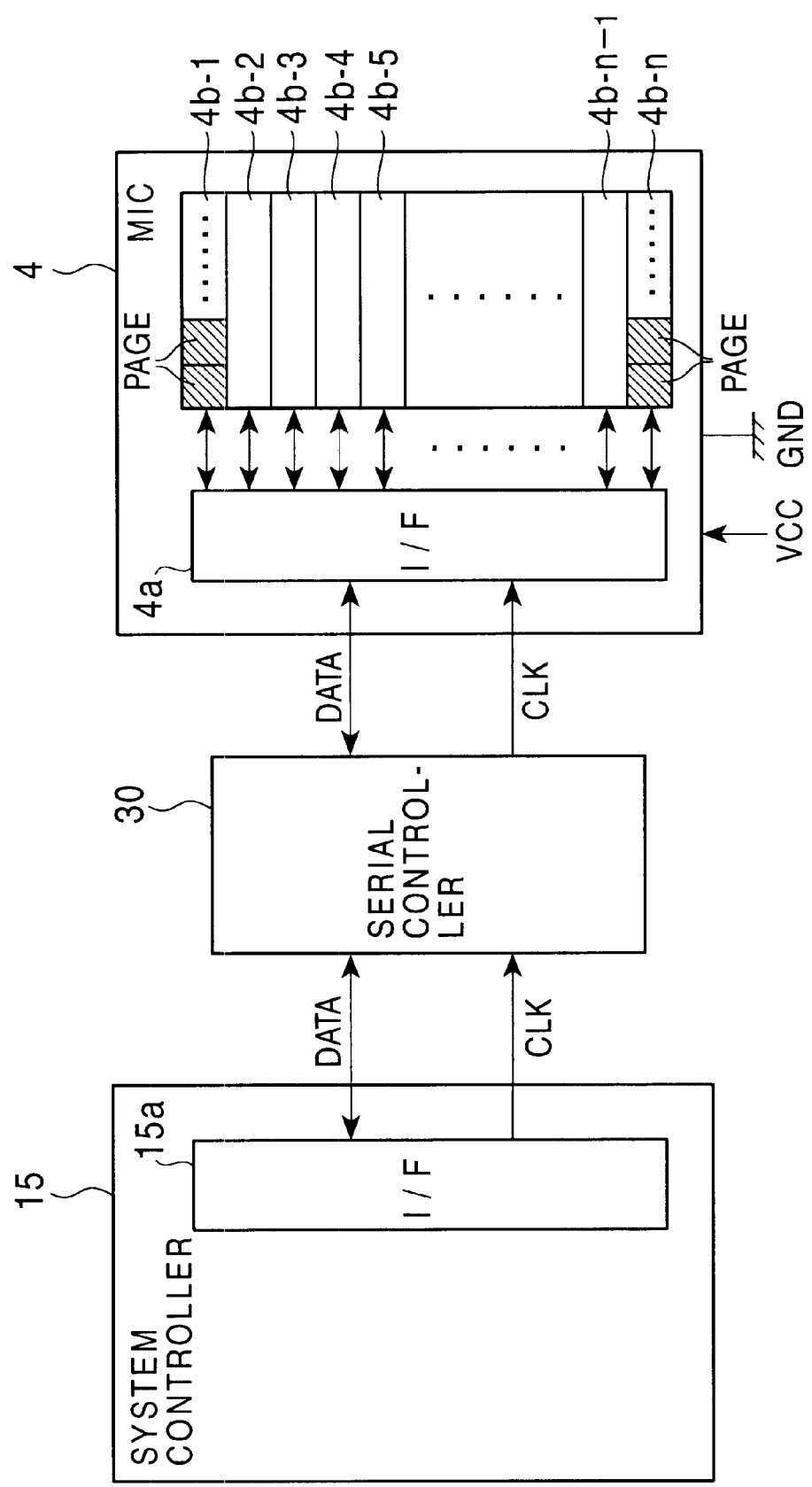
FIG. 9 is a block diagram showing an outline of data communication between the system controller 15 and the MIC 4 shown in FIG. 1.

FIG. 9 is a drawing illustrating an outline of data transfer.

In the MIC 4 shown in FIG. 9, storage areas 4*b*-1 to 4*b*-n having a data structure using the predetermined units are formed, and the MIC 4 has a structure in which the writing/reading of data to/from each storage area is performed using a predetermined data length (page unit). In other words, data writing/reading is performed in units of pages. In the MIC 4, a data input (DATA), a clock input (CLK), a power supply (VCC), and a ground (GND) are shown, and the input/output is performed via the terminals shown in FIGS. 2 and 3.

When the system controller 15 requests the desired data from the MIC 4, the output of the data (DATA) corresponding to the predetermined frequency clock CLK and the data request is performed via an interface 15*a*. The clock CLK and the data (DATA) are supplied to an interface 4*a* of the MIC 4 via a serial interface 30. Thereby, from the MIC 4, data stored in predetermined page units in the storage areas 4*b*-1 to 4*b*-n can be selectively read based on the clock CLK.

When data writing is performed, the system controller 15 transfers data corresponding to the page units to the MIC 4, and the received data are written in the predetermined storage area in the MIC 4.

In this case, as described also in the Related Art, in the case where the communication method of the tape streaming drive 10 is inferior to the communication method of the MIC 4, data transfer can be efficiently performed.

For example, in the case where a maximum page unit in the MIC 4 is adapted for, e.g., 32 bytes, if the tape streaming drive 10 is set so as to perform 16-byte-unit transfer, data must be transmitted twice. Moreover, concerning the clock frequency, in the case where the MIC 4 is adapted for a maximum of 400-kHz clock frequency, if the tape streaming drive 10 is set so as to output only the clock CLK at, e.g., 100 kHz, the tape streaming drive 10 can simply perform data communication but cannot perform efficient data transfer by fully using the data transfer speed of the MIC 4.

Accordingly, in this embodiment, when the tape cassette 1 is loaded into the tape streaming drive 10, the system controller 15 detects a maximum clock frequency (FL11) and a maximum write cycle (FL12) as data transfer information in the manufacture information shown in FIG. 5, and recognizes a maximum clock frequency and a maximum page length (write cycle) which correspond to the loaded MIC 4. Therefore, even when a different tape cassette 1 is loaded, the communication method of the tape streaming drive 10 can be set each time based on the maximum clock frequency and the maximum page length.

Thereby, the tape streaming drive 10 can switch its operation condition in accordance with the MIC 4, whereby when data transfer is performed, communication can be performed by fully using the performance of the MIC 4.

5. Detection of Data transfer information

Figure 10:
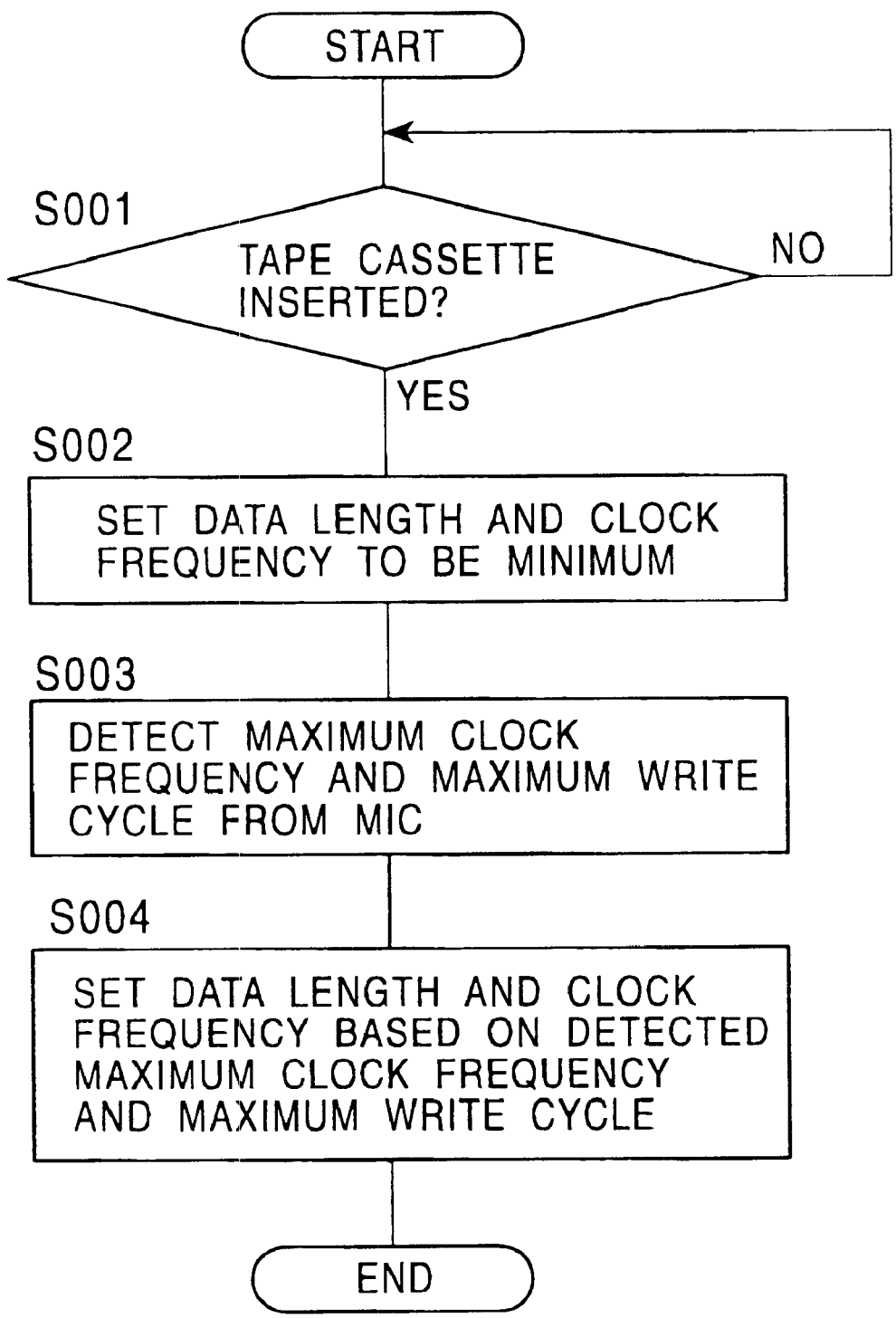
FIG. 10 is a flowchart illustrating a process for setting, based on data transfer information stored in the MIC 4 according to an embodiment of the present invention, the communication method of the tape streaming drive 10 according to another embodiment of the present invention.

FIG. 10 is a flowchart illustrating an example of a process by the system controller 15 when the clock frequency and the write cycle are set in the tape streaming drive 10.

When it is detected that the tape cassette 1 has been loaded into the tape streaming drive 10 (S001), the page length and the clock frequency of the tape streaming drive 10 are set to their minimum values (e.g., a page length of 16 bytes, a clock frequency of 100 kHz) (S002), and the maximum clock frequency and the maximum write cycle are detected by accessing the MIC 4 (S003). The minimum values set in step S002 are a page length and a clock frequency set as initial values in the tape streaming drive 10 so that no values are equal to or less than the length and the frequency in the MIC 4. A lowest data transfer rate is set.

Based on the maximum clock frequency and the maximum write cycle, the clock frequency and the page length in the tape streaming drive 10 are set (S004). The page length and the clock cycle, set in step S004, are stored in, e.g., an SRAM 24. For example, in the case where the communication method of the MIC 4 is set so that the clock frequency is 400 kHz and the page length is 32 bytes, the maximum clock frequency and the maximum write frequency are used to obtain these values in the tape streaming drive 10.

Thereby, the tape streaming drive 10 can access the MIC 4, using a page length of 32 bytes which is maximum in the MIC 4. Accordingly, data transfer processing, performed twice in the case where a page length of, e.g., 16 bytes is used for accessing, can be achieved by data transfer processing using a single access, whereby transfer of a large amount of data can also be efficiently performed.

In addition, the tape streaming drive 10 can be adapted for the case where a maximum clock frequency of 400 kHz is generated and output. Thus, data transfer can be performed at a greatly high speed.

In the process shown in FIG. 10, the case where the clock frequency and the page length in the tape streaming drive 10 are set to their minimum values when the tape cassette 1 is loaded has been described. This is because it is assumed that the clock frequency and the page length, set based on the maximum clock frequency and the maximum write cycle, are maintained even after unloading of the cassette.

Therefore, when the tape cassette 1 is unloaded from the tape streaming drive 10, the clock frequency and the page length may be set to their minimum values by executing a process corresponding to step S002 in FIG. 10.

In this embodiment has been described the case where 400 kHz is used as the maximum clock frequency stored in the MIC 4. However, the value is dependent on physical characteristics of a nonvolatile memory used as the MIC 4, as described above. Accordingly, in accordance with the characteristics, values such as 100 kHz, . . . , 400 kHz, 800 kHz, and 1600 kHz are stored. Concerning the maximum write cycle, the case using 32 bytes has been described in this embodiment. However, in accordance with the characteristics, values such as 16 bytes, 32 bytes, and 64 bytes are stored.

What is claimed is:

1. A tape drive unit comprising:

tape drive means for recording or reproducing information on or from a magnetic tape when a tape cassette including the magnetic tape is loaded;

memory drive means for reading or writing management information by performing communication with a memory for managing recording to or reproduction from the magnetic tape when the loaded tape cassette includes the memory;

means for detecting data transfer information about the memory, the data transfer information stored in the memory; and means for setting, based on the data transfer information, the communication method of said memory drive means, wherein the communication method setting means sets said memory drive means to be in initial condition before the data transfer information is detected, wherein in the initial condition, a lowest clock frequency and a shortest unit-data length capable of being set by said memory drive means are set.

2. A tape drive unit comprising:

tape drive means for recording or reproducing information on or from a magnetic tape when a tape cassette including the magnetic tape is loaded;

memory drive means for reading or writing management information by performing communication with a memory for managing recording to or reproduction from the magnetic tape when the loaded tape cassette includes the memory;

means for detecting data transfer information about the memory, the data transfer information stored in the memory; and means for setting, based on the data transfer information, the communication method of said memory drive means, wherein the data transfer information consists of unit-data information and clock-frequency information used when the memory performs data communication with said memory drive means.

3. A recording medium comprising:

a tape cassette including a magnetic tape; and a memory included in said tape cassette, said memory provided for storing management information for managing recording to or reproduction from the magnetic tape;

wherein data transfer information on said memory is stored in said memory, wherein the data transfer information consists of unit-data-length information and clock-frequency information used when data communication is performed with a memory drive means in a tape drive unit into which said recording medium is loaded.

4. A tape drive unit comprising:

tape drive means for recording or reproducing information on or from a magnetic tape when a tape cassette including the magnetic tape is loaded;

memory drive means for reading or writing management information by performing communication with a memory for managing recording to or reproduction from the magnetic tape when the loaded tape cassette includes the memory;

means for detecting data transfer information about the memory, the data transfer information stored in the memory; and means for setting, based on the data transfer information, the communication method of said memory drive means, wherein the communication method setting means sets said memory drive means to be in initial condition before the data transfer information is detected, wherein the data transfer information consists of unit-data information and clock-frequency information used when the memory performs data communication with said memory drive means.

* * * * *